United States Patent [19]

Friggstad et al.

[11] Patent Number: 4,840,233
[45] Date of Patent: Jun. 20, 1989

[54] AGRICULTURAL IMPLEMENT HAVING ROCK SHAFT ACTUATED TRANSPORT WHEEL FRAMES

[75] Inventors: Terrance Friggstad; David R. Hundeby, both of Saskatoon, Canada

[73] Assignee: Flexi-Coil Limited, Saskatoon, Canada

[21] Appl. No.: 155,516

[22] Filed: Feb. 12, 1988

[30] Foreign Application Priority Data

Feb. 3, 1987 [CA] Canada ................................. 528908

[51] Int. Cl.⁴ .................. A01B 63/22; A01B 73/04
[52] U.S. Cl. .................................. 172/311; 172/401; 172/413; 172/776; 280/43.13; 280/43.23
[58] Field of Search ............... 172/776, 413, 311, 328, 172/400, 401, 40, 415; 280/43.13, 43.16, 43.23, 716; 296/29, 35.1

[56] References Cited

U.S. PATENT DOCUMENTS

| | | | |
|---|---|---|---|
| 2,641,886 | 6/1953 | Graham | 172/311 |
| 3,544,129 | 12/1970 | Henry-Biabaud | 280/716 |
| 3,866,688 | 2/1975 | Hansen | 172/311 |
| 3,880,241 | 4/1975 | Vincent | 172/311 |
| 3,913,683 | 10/1975 | Olsson | 172/240 |
| 3,990,521 | 11/1976 | Ankenman | 172/311 |
| 4,355,689 | 10/1982 | Friggstad | 172/311 |
| 4,387,772 | 6/1983 | Bourgault | 280/43.13 X |
| 4,676,321 | 6/1987 | Friggstad | 172/776 |

Primary Examiner—Richard J. Johnson
Assistant Examiner—Jeffrey L. Thompson
Attorney, Agent, or Firm—D. Ron Morrison

[57] ABSTRACT

A height adjusting mechanism for a framework that supports a multiplicity of ground working tools of an agricultural implement operating at variable depths of ground penetration is disclosed. The variability is achieved by rotation of framework supporting rock shafts pivoting around pivot points on wheel supported wheel frames, which in turn support the rock shafts; rotation causes the lateral spacing of the wheels to vary also. Additionally, flexibility of the framework optionally is provided by having certain fastenings and pivotal attachments between framework members in the form of resilient connections. The novel flexible framework is not critical to operation of the height adjusting mechanism, the latter being operable also with rigid framework.

22 Claims, 6 Drawing Sheets

AGRICULTURAL IMPLEMENT HAVING ROCK SHAFT ACTUATED TRANSPORT WHEEL FRAMES

This invention relates to agricultural implements and more particularly to a height adjusting mechanism for a framework for supporting a multiplicity of ground working tools at variable heights relative to ground level for purposes of, for example, tilling, cultivating, fertilizing, or seeding the soil.

In an earlier United States patent of Terrance Friggstad, U.S. Pat. No. 4,676,321 of June 30, 1987, the invention there disclosed is a framework for such ground working tools, the framework being exceptionally flexible and adaptable to rough ground contours, but somewhat expensive to manufacture because its design generally required the use of a large number of ball and socket joints between structural members, to reduce the stress placed on the members when they moved relative to one another in passing over undulating ground. Furthermore, the exceptional flexibility created problems in folding multisectional implements to transport position.

The framework of the present invention provides a simpler design in which fewer joints requiring the immense flexibility of ball and socket joints are required to connect the structural members, and many of the joints between structural members requiring only limited articulation around three axes of rotation intersecting at mutual right angles can be of a much less expensive form than classic ball and socket joints. It may be noted at this point that a ball and socket joint connecting two rigid structural members permits relative movement of the members around three axes of rotation intersecting at mutual right angles, although the movement around one or more of the axes may be restricted or limited. A universal joint connecting two rigid structural members permits relative movement of the members around two axes of rotation intersecting at right angles, rotation of one of the members around the third axis intersecting the others at mutual right angles inexorably being transmitted to the other member through the universal joint, thus permitting a driving shaft to transmit its torque through a universal joint to a driven shaft. A pin joint connecting two rigid structural members generally permits relative movement of the members around no more than one axis, that being the axis through the center of the pin.

In the aforementioned earlier invention, at least two flexible linked parallel rigid bars for supporting ground working tools are linked by pairs of parallel rigid links, which maintain the bars in parallel relationship. The parallel rigid bars are supported on wheels mounted below and ahead of the rigid bars; lower means are used to displace the parallel rigid links relative to one another and thereby rotate the rigid bars around the axles of their respective supporting wheels, thus raising or lowering the rigid bars relative to the ground and so varying the height or depth of penetration into the ground of ground working tools fastened to the rigid bars. A preferred form of the aforementioned invention utilizes three ranks of parallel rigid bars, with each rank being flexibly linked to one other rank by pairs of parallel links, thus providing complete flexibility between the ranks of tools of the implement in the longitudinal direction, i.e. from front to back of the implement. Flexibility of the implement in the transverse direction for the wide embodiments preferred for efficient agricultural operations is achieved by having the ranks of rigid bars divided into sections which are flexibly connected so that wing sections on the side of center section can rise and fall when passing over undulating ground independently of the movement of the center section. As is conventional in the agricultural implement art, provision also is made to lift the wing sections hinged to the center section to a transport position using suitable power means, thus permitting passage of the wide implement through farm gates and along roadways.

It has been found that flexibility between the longitudinally spaced ranks of ground working tools is not critical when the distance between the front and rear ranks of the ground working tools is small relative to the length of the ranks of the ground working tools, i.e. relative to the width of the implement. It is thus unnecessary to have each rank of ground working tools and the rigid bars on which they are carried, supported on individual respective sets of wheels around whose axles the rigid bars must be rotated to vary the operating depth or height of the ground working tools. Thus the prior art need for the multiple pairs of parallel rigid links and for the numerous ball and socket joints required to connect them to the rigid bars can be eliminated by a different arrangement for varying the elevation above ground level of rigid bars on which ground working tools can be mounted. These rigid bars are hereinafter referred to as tool mount bars.

The present invention thus consists of a height adjusting mechanism for a framework that supports a multiplicity of ground working tools of an agricultural implement whereby the tools can be variably positioned for variable ground penetration, comprising:

(a) a set of at least four wheels mounted on two horizontally and longitudinally disposed wheel frames, each wheel frame being supported by at least two of said wheels, disposed proximate the respective ends of said frames, (b) two rigid, longitudinally disposed, rock shafts, each pivotally attached to, at two points proximate the two ends of, a respective one of said wheel frames, said rock shafts being adapted to pivot relative to their respective wheel frames on longitudinal axes passing through the pivotal attachments on their respective wheel frames, at variable elevations above their respective wheel frames, (c) two longitudinally spaced, transversely disposed, rigid, horizontal, tool mount bars, each pivotally attached, adjacent its two ends, to the two said rock shafts, said tool mount bars being disposed above said rock shafts and adapted to support two ranks of ground working tools, (d) at least two longitudinally disposed, rigid, frame bars, transversely spaced along said tool mount bars and fastened thereto to maintain the latter in spaced parallel relationship, and (e) power means to pivot said rock shafts in opposite directions, simultaneously and through equal angles, around their respective pivotal axes.

In a preferred form of the invention, a third tool mount bar is disposed transversely behind the first two tool mount bars and is fastened to the two frame bars, thereby providing support for a third rank of ground working tools.

A more preferred form of the invention provides a multisection framework for supporting a multiplicity of ground working tools of an agricultural implement comprising, as a center section, a framework with height adjusting mechanism as defined above and further comprising, on each side of said center section framework, at least one wing section of framework for supporting a multiplicity of ground working tools, each said wing section comprising:

(a) a set of at least two longitudinally spaced wheels mounted on a horizontally and longitudinally disposed wing section wheel frame, (b) a rigid, horizontally disposed, wing section rock shaft, pivotally attached to said wing section wheel frame at points proximate said wheels and adapted to pivot relative to said wheel frame on a horizontal longitudinal axis passing through said points of pivotal attachment to said wheel frame, at variable elevations above said wheel frame, (c) longitudinally spaced, transversely disposed, rigid, horizontal, wing section tool mount bars, each one being aligned with a corresponding tool mount bar of said center section, pivotally attached at its end nearer the center section to the adjacent end of the corresponding tool mount bar of the adjacent section, and adapted to pivot on a horizontal axis through the respective pivotal attachments between the corresponding tool mount bars, the distal ends of the first and second of said tool mount bars of said wing section being pivotally attached to and disposed above said wing section rock shaft, (d) a longitudinally disposed, rigid, wing section frame bar, fastened to each said wing section tool mount bar to maintain the latter in spaced parallel relationship, and (e) means, connected to said power means, to pivot said wing section rock shaft through equal angles simultaneously with, and in the same direction as, the pivoting of the adjacent rock shaft of said center section.

The invention further consists in a resilient planar framework for supporting a multiplicity of ground-working tools, said framework comprising rigid structural members having resilient fastenings between said rigid members which are fastened together, and having resilient pivotal attachments between said rigid members which are pivotally attached, said resilient fastenings being adapted to permit torsional flexing between the rigid members so fastened and said resilient pivotal attachments being adapted to permit relative movement between pivotally attached rigid members around the two axes at mutual right angles to the axis of their pivotal attachment.

To simplify an understanding of the present invention, it should be appreciated that practically all wheeled vehicles, including farm implements, have and maintain some fixed transverse spacing between their wheels. For example, railway car wheels must remain uniformly spaced apart transversely of the railway car in order for the car to remain on the rails. Similarly automobiles, trucks, farm tractors, and most other multi-wheeled vehicles including agricultural implements having transversely spaced wheels, maintain some fixed transverse spacing between those wheels. The present invention foregoes the concept of having or maintaining a fixed transverse spacing between wheels, and thereby makes provision for an effective arrangement for varying the elevation, relative to ground level, of ground working tools being supported by those wheels.

The invention will be more readily understood from the ensuing description thereof with reference to the accompanying drawings wherein the same numbers are used to identify identical parts throughout the drawings and in which:

FIG. 6 is a cross sectional side elevation, viewed from the center line of a center section, of parts of a preferred center section embodiment.

FIG. 7 is a plan view of the parts shown in FIG. 6.

Figure 1:
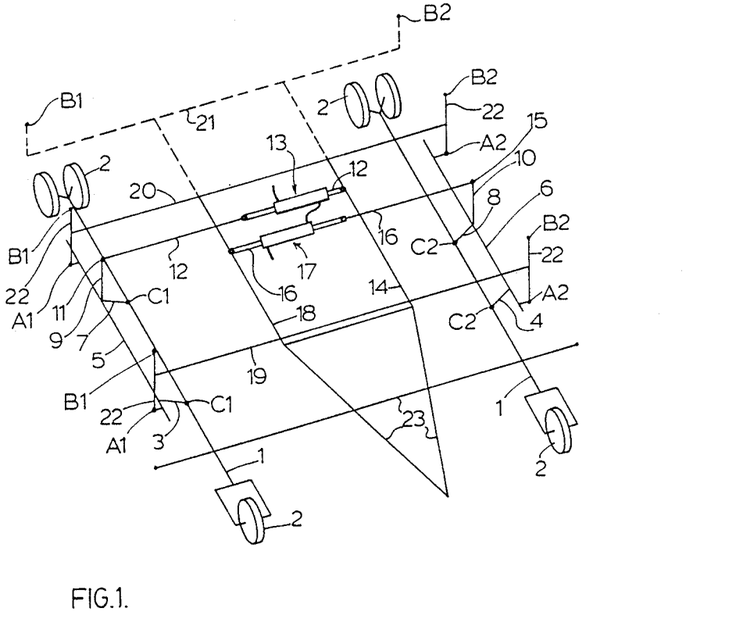
FIG. 1 is a diagrammatic isometric projection, omitting numerous extraneous parts, of essential structural members of a simple embodiment of the invention.

In FIG. 1, structural members, which are of conventional structural steel construction, are shown diagrammatically and out of proportion for simplicity of illustration. The figure shows a simple planar framework in accordance with one embodiment of the invention, the framework being supported on the ground by a pair of three wheeled "tricycle" frames, 1, all three wheels, 2, of each frame being shown. The length of the frames 1 is not critical, it being chosen to place the wheels at the most convenient positions longitudinally with reference to the tool mount bars, thereby carrying the load of the framework most effectively. There are two pairs of pivot points, C1 and C2, one pair on each wheel frame, each conveniently in lugs or small flanges, each rigidly secured to its respective frame. Theoretical axes, C pass through these pairs of pivot points. Pivotally attached to the respective forwardmost pivot points C1 and C2 are connecting members or rigid flanges 3 and 4 respectively, the flanges being rigidly secured to, and adjacent, the forward ends of rigid rock shafts 5 and 6 respectively. Rearwardly along rock shafts 5 and 6 from flanges 3 and 4 respectively are rigid flanges 7 and 8, each fastened rigidly to its respective rock shaft and attached pivotally to the respective rearwardmost pivot points C1 and C2 respectively. Flanges 3, 7, 4, and 8 project upwardly and outwardly from their respective pivot points C1 and C2, outwardly in this instance meaning substantially at right angles away from the longitudinal center line of the framework. Additionally, rigid flange levers 9 and 10, conveniently being rigid extensions of flanges 7 and 8 respectively, project upwardly from rock shafts 5 and 6 respectively. The top flange lever 9 is pivotally attached at pivot point 11 to one end of a rigid bar mechanism 12 containing an hydraulic ram 13. The distal end of bar mechanism 12 is fastened to a fixed point on a convenient rigid framework member, in this embodiment rigid frame bar 14. Similarly the top of flange lever 10 is pivotally attached at pivot point 15 to one end of another rigid bar mechanism 16 containing another hydraulic ram 17. The distal end of bar mechanism 16 also is fastened to a fixed point on a convenient rigid framework member, in this embodiment rigid frame bar 18. The two rigid bar mechanisms are principal parts of the power means to pivot the rock shafts 5 and 6 in opposite directions simultaneously and through equal angles around their respective axes C passing through the pairs of pivot points C1 and C2 respectively.

Operation of the power means will be explained more fully subsequently herein.

Figure 2:
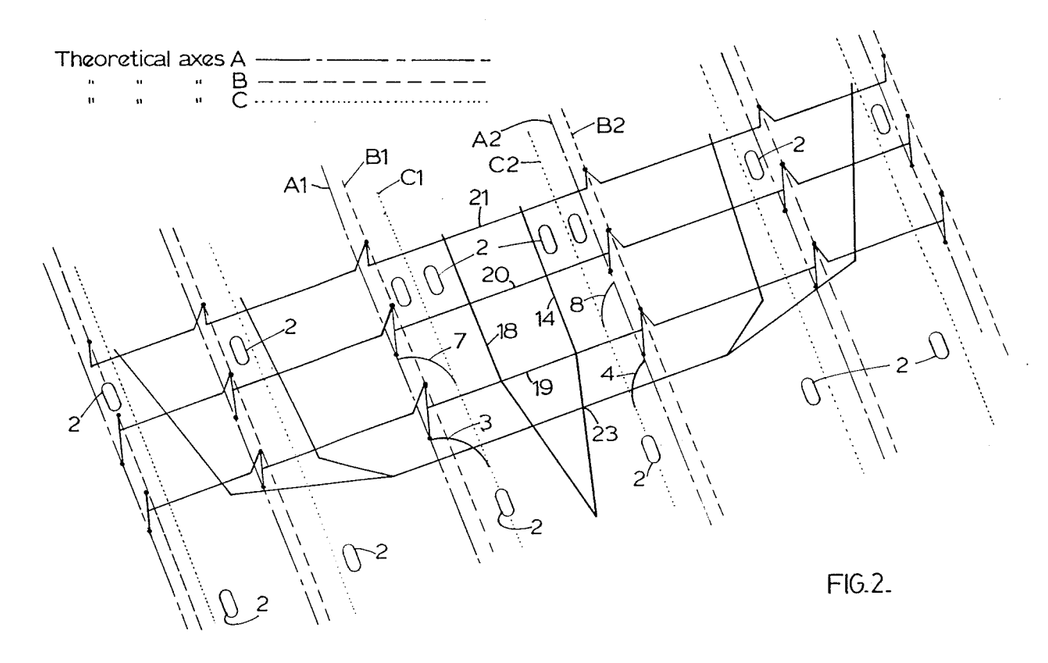
FIG. 2 is another diagrammatic isometric projection, again omitting numerous extraneous parts, showing an arrangement of some of the principal parts of a more extensive embodiment of the invention, more specifically a five section implement having a center section and two wing sections on each side thereof.

Two or more longitudinally spaced, horizontal, rigid, tool mount bars are transversely disposed across frame bars 14 and 18, and fastened to each of them. The two essential tool mount bars are designated as 19 and 20, and an optional third one is indicated by the dotted member 21, fastened to the extensions of frame bars 14 and 18, also indicated by dotted lines. At each end of each of horizontal tool mount bars 19 and 20 there are short, rigidly mounted, vertically disposed, rigid flanges 22 extending above and below the level of the tool mount bars. The length of these flanges is exaggerated in figures of the drawings for clarity of illustration. Tool mount bar 21 also has vertical flanges 22 which need extend only above the tool mount bar 21. Near the bottom end of flanges 22 on tool mount bars 19 and 20 there are pivoting connections or attachments A1 to lugs or flanges on rock shaft 5 and pivoting connections or attachments A2 to lugs or flanges on rock shaft 6. Two respective theoretical axes, A, pass through these pivoting connections A1 and A2 respectively. Near the top end of flanges 22 on tool mount bars 19, 20 and 21, there are pivoting connections B1 and B2 for optional attachment of tool mount bars of adjacent wing sections of frame work. Two respective theoretical axes, B, pass through these pivoting connections B1 and B2 respectively Optional wing sections of framework on each side thus can pivot about the B axes respectively, providing ample lateral flexibility for wide implements of multiple sections, as illustrated in FIG. 2.

Previously mentioned rigid horizontal frame bars 14 and 18 extend substantially longitudinally between the tool mount bars, and are fastened thereto to maintain the tool mount bars in spaced parallel relationship and to transmit the pull, applied by drawbar 23, to all the tool mount bars. The frame bars are pivotally attached to the drawbar, as is conventional in the art. Various forms and designs of drawbar may be used to pull the framework, from the simple A-frame design illustrated in FIG. 1 to any of numerous, more complicated designs more suitable for multi-section frameworks illustrated in FIG. 2.

The rigid bar mechanisms 12 and 16 were referred to earlier herein as principal parts of the power means to pivot the rock shafts 5 and 6 in opposite directions namely clockwise and counter-clockwise) simultaneously and through equal angles around their respective axes C passing through pivot points C1 and C2 respectively. Simultaneous and equal displacement of the hydraulic cylinders 13 and 17 is obtained by phasing the cylinders, that is to say arranging the hydraulic supply lines to and from a pair of identically sized cylinders so that, to extend the cylinders, hydraulic fluid pressure is applied to one cylinder only and the pressure is transmitted through that cylinder to the second cylinder connected hydraulically in series therewith; to contract the cylinders, hydraulic pressure is applied only to the second cylinder and the pressure transmitted through the second cylinder back to the first through the hydraulic series connection. Other embodiments of power means, described in more detail later herein, can be used in lieu of the dual phased cylinder arrangement just described, to achieve simultaneous and equal displacement of the rock shafts. It may be mentioned here briefly that, for example, a single hydraulic cylinder or hydraulic ram can be mounted to extend and contract between a pivoting lever and a pivoting link, the lever and the link being pivoted on the same rigid tool mount bar, with a rigid evener link pivotally connecting the pivoting lever and pivoting link, to ensure simultaneous equal displacement of each end of the hydraulic cylinder against rigid bars linking the hydraulic cylinder to respective rock shafts.

From the foregoing description it can be seen that power means is used to displace, outwardly (i.e. away from the longitudinal center line of the framework), simultaneously, and in equal amounts, two rigid bars pivotally connected at their distal ends to the two flange levers 9 and 10 respectively. Displacement of the said bars displaces the flange levers 9 and 10 and forces them, and the rock shafts 5 and 6 to which they are respectively rigidly fastened, to rotate in respective arcs around theoretical axes A running through pivoting connections A1 and A2 respectively. As the rock shafts rotate on axes A, they force the flanges 3 and 7 on rock shaft 5, and flanges 4 and 8 on rock shaft 6, also to move in arcs around axes A. The axes A remain a fixed distance apart, the distance being determined by the length of the rigid tool mount bars 19 and 20 on the ends of which are the rigidly mounted vertical flanges, through the lower parts of which the respective A axes pass. As the rock shafts and flanges 3, 7, 4 and 8 move around axes A, the vertical distance between the tool mount bars, 19 and 20, and the wheel frames, 1, changes, thus varying the position, relative to the ground, of any tools mounted on the tool mount bars. Because the A axes remain a fixed distance apart, as previously noted, not only does the vertical distance between the tool mount bars and the wheel frames 1 change, but also the transverse distance between the wheel frames 1 changes. Thus the framework of the present invention does not have a fixed transverse spacing between its wheels, but permits this spacing to change as the elevation of the ground working tools relative to the ground is changed. There is no problem created by a varying transverse spacing of the wheels of the framework, as there is no need for it to remain constant as there is, for example, with vehicles running on rails.

Figure 8:
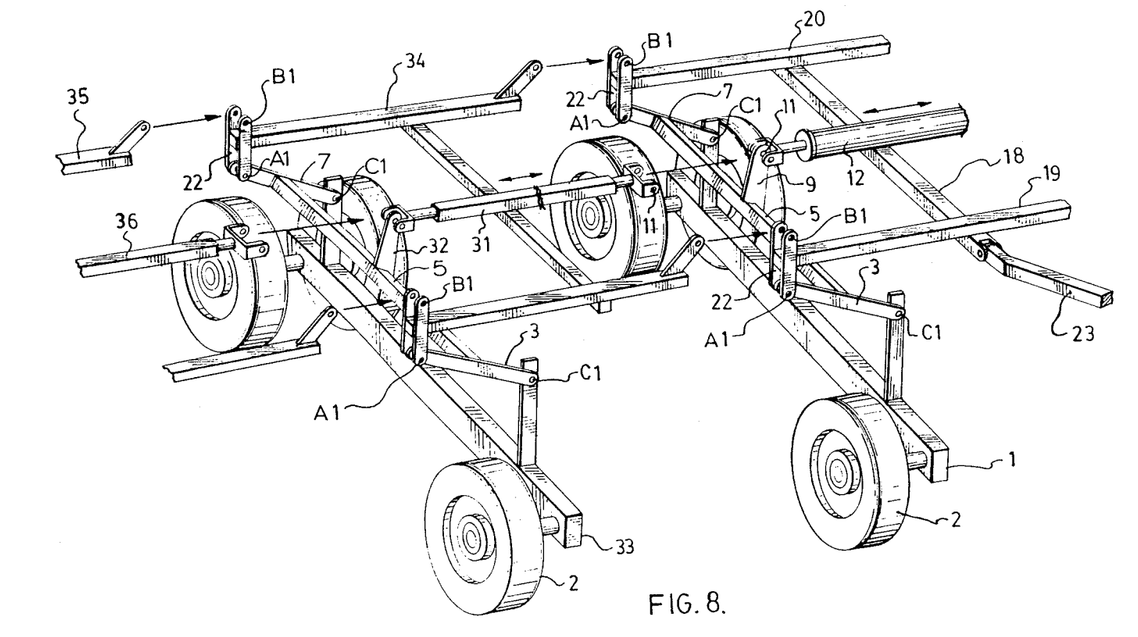
FIG. 8 is an isometric projection illustrating the spatial arrangement of some critical parts of one symmetrical half of a center section, an inner wing section, and part of an outer wing section in one embodiment of the invention, in particular two rock shafts and their connections.

Better understanding of the operation of the rock shafts may be gained from FIG. 8, showing two of the three identical rock shafts 5 which have the same configuration as the third of the three rock shafts on the left half of the five section framework illustrated in FIG. 2. Rock shafts on the other half of the framework of FIG. 2 would be identical but connected to the corresponding parts to pivot in the direction opposite to the pivoting of the rock shafts referred to on the left half of FIG.

Figure 4:
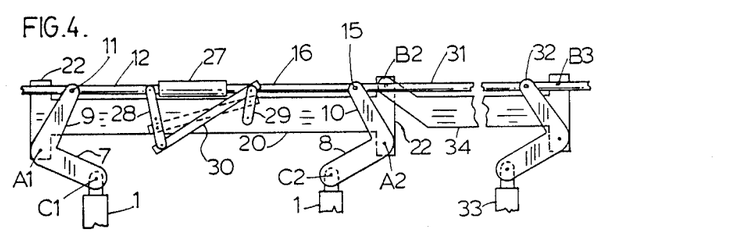
FIG. 4 is a front elevation of a preferred embodiment of the power means, utilizing a single hydraulic cylinder to achieve simultaneous and equal variation in the elevation of ground working tools of a center and inner wing section of framework.
Figure 5:
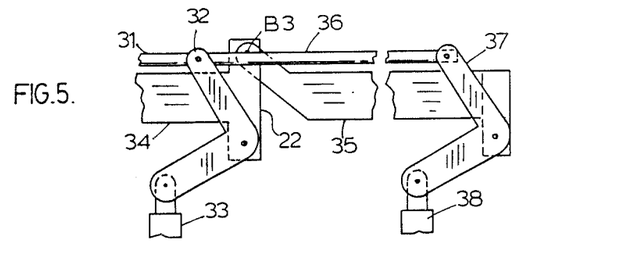
FIG. 5 is an extension of FIG. 4 showing the extension of the power means of FIG. 4 past an inner wing section to an outer wing section.

2. Thus FIG. 8 shows some parts on the center section, the inner left wing section, and the outer left wing section, with wheel frame 1 of the center section and wheel frame 33 of the inner wing section, mounted on wheels 2 supporting flanges 3 and 7, via lugs on the wheel frames, at pivot points C1. Rock shaft 5 is rigidly fastened to flanges 3 and 7. Flange lever 9, also rigidly fastened to the rock shaft, is connected at pivot point 11 to one end of rigid bar mechanism 12; in the case of rock shafts of wing sections, the flange levers corresponding to 9, i.e. 32 and 37 in FIGS. 4 and 5, are pivotally connected to extension bars, 31 and 36, as more fully explained later with reference to FIGS. 4 and 5. Tool mount bars 19 and 20 are held in parallel spaced relation by frame bar 18. Rigid flanges 22 on the ends of the tool mount bars extend above and below these bars. Flanges 3 and 7 on rock shaft 5 also are pivotally attached at pivot points A1 near the bottoms of flanges 22. Near the top ends of flanges 22 are pivot points B1 at which tool mount bars of the adjacent wing section of framework are pivotally attached, 34 being typical of such tool mount bars shown in both FIG. 8 and FIG. 4. Extension bar 31, pivotally attached to rigid bar mechanism 12 at pivot point 11, transmits the displacement of rigid bar 12 to rotate the rock shaft of the adjacent wing section, in both FIGS. 8 and 4. Power means, as previously described, displaces the rigid bars and extension bars, on each side of the centerline of the framework, by equal amounts and rotates each of the rock shafts in equal arcs around the pivot points A1 and the A axes through their respective flanges 22.

To facilitate turning of the framework of this invention it is desirable that the front wheels on the wheel frames be castor mounted. A particularly effective castor mounting is the double castor mounting shown diagrammatically in FIG. 1. The horizontal axle of the wheel is held at its ends by a pair of crab claw shaped arms which extend out and back from the axle and are each pivotally attached, at their distal ends, to vertical pivots on the ends of a transverse bar on the front of the wheel frame. The attachments of the axle ends to the front of the arms also are on vertical pivots. The double castoring provided by the two pairs of vertical pivots between the horizontal axle and the rigid wheel frame provides great flexibility in the turning of the wheel and permits it to turn on a very short radius, thus facilitating the turning of the implement when it is pulled around a sharp curve. Another major advantage of the arrangement is its low profile, which enables it to avoid interference with drawbar members, which can move freely over the castoring wheels. An alternative castoring wheel arrangement is shown in FIGS. 6 and 7.

It is a most preferred feature of this invention that the tool mount bars be resiliently, not rigidly, fastened to the frame bars. Rigid fastening of the tool mount bars to the frame bars creates a rigid plane of these members. Resilient fastening permits torsional flexing between the rigid members so fastened, that is slight rotational movement of at least one of the rigid members about an axis or axes parallel and proximate the theoretical plane passing through the members at their point of attachment. Furthermore it is a most preferred feature of the invention that some pivotal connections between some rigid structural members, all of which connections are classifiable as pin joints, should also provide some resiliency so that slight rotation can occur around the other two axes which intersect the pin axis of the respective resilient pivotal connections at mutual right angles.

Such resiliency modifies the nature of the specified pivotal connections or pin joints of the invention, providing them with characteristics of the more flexible ball and socket joints. It is for this reason that a number of the rigid members can be defined as being resiliently pivotally attached to other rigid members, and not defined simply as being pivotally attached. However, the height adjusting mechanism of the invention does not depend on flexibility or resiliency of the planar framework for successful operation, the mechanism being effectively operable on a completely rigid framework. Nonetheless, resiliency in the framework is preferred for durability. Some further details for providing resiliency to the pivotal connections are mentioned subsequently herein.

Figure 3:
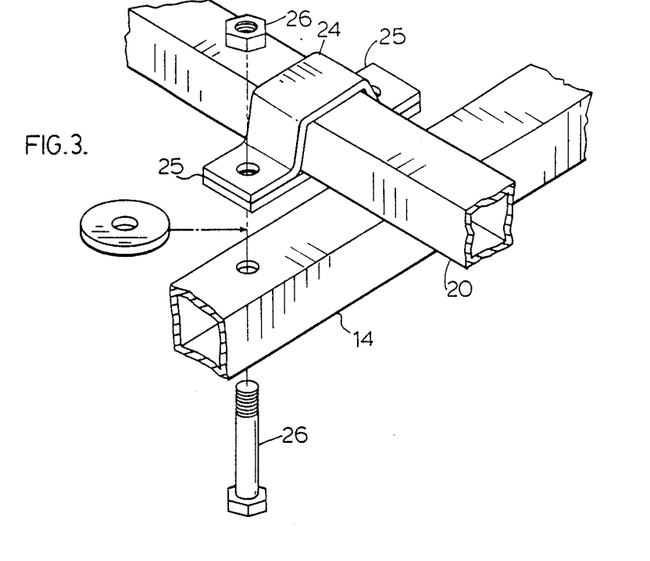
FIG. 3 is an exploded partial view of some of the parts used to assemble an embodiment of a resilient fastening between a tool mount bar and a frame bar initially preferred in the invention.

Referring again to the resilient fastening of the frame bars to the tool mount bars, the framework of this invention could be overstressed and impractical if the frame bars were rigidly fastened to the tool mount bars, as, for example, by welding, riveting, or rigidly bolting them. Considering for example a four wheeled center section, there are four points of support on the wheel frames for all the framework above the wheel frames. When the wheels are on uneven ground, with no load on the framework, three of the wheels could be supporting the framework on the ground and the fourth wheel held in the air by the plane of the substantially rigid framework. Under load of numerous ground working tools working in the soil on such uneven ground, the plane of the framework inexorably tends to distort and weigh the fourth wheel down into contact with the ground. Under such distortion, rigid fastenings between frame bars and tool mount bars are prone to, and likely to, fracture, for example by shearing of bolts or rivets or welds, particularly in framework sections having three or more tool mount bars. To accommodate such distortion, the wheel mount bars and frame bars in the present invention preferably are fastened together to provide resilience in the fastenings, thereby providing for flexing, for example torsional flexing, between the structural members. An example of a resilient fastening between a tool mount bar, for example 20, and a frame bar, for example 14, is a pair of loose clevis and tongue connections, or a pair of clevis and tongue mounted spherical bushings forming a pair of ball and socket joints. Another is illustrated in FIG. 3. A rigid bracket 24 rigidly fits around tool mount bar 20, and has flanges 225 on each side of the tool mount bar. Bolt holes in the flanges of the bracket are aligned with bolt holes in frame bar 14. Before bolting bracket 24 to frame bar 14 with a bolt and nut assembly 26 for each bracket hole, at least one large resilient washer, 50, for example of from 5 to 10 or more cm diameter and 1 to 2 or more cm thickness, is placed around each bolt between the bracket flanges 25 and the frame 14. These resilient washers can be made, for example, from natural rubber, synthetic rubber, resilient polyurethane plastic, or other durable, resilient material. When assembled, the bolt and nut assemblies are not tightened to compress the resilient washer to its maximum compressibility, but left loose enough that the washer can compress further over various segments of its circumference to permit rotation of either the frame bar or the tool mount bar with respect to the other around their axes in horizontal planes. As shown in FIG. 3, the bracket permits ample resiliency for torsional rotation of tool mount bar 20 around the axis of frame bar 14; demand for torsional rotation of the frame bar around the axis of the tool mount bar is generally negligible in comparison, and is adequately provided by the bracket and resilient washers. In another embodiment, resiliency could be obtained at the fastening by using a substantially identical assembly but, instead of resilient washers, with strong, partially compressed, coiled springs providing resiliency at each bolt. In still other variations, belleville washers, or a stack of partially compressed split lock washers could be substituted for the single resilient washer described above.

Figure 9:
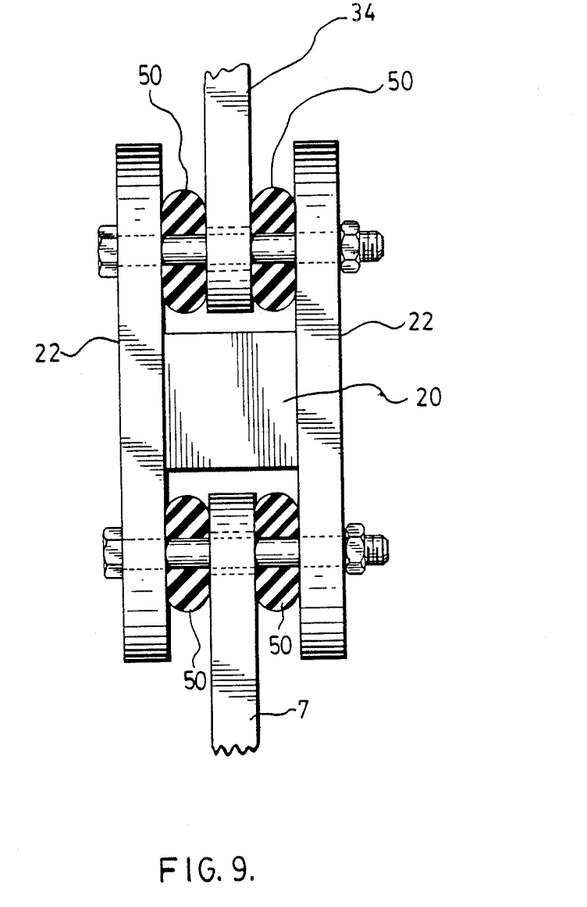
FIG. 9 is an end view of the flanged end of a tool mount bar showing resilient pivotal connections between the tool mount bar and a rock shaft and between the tool mount bar of one section and the tool mount bar of an adjacent section.

It has been mentioned above that it is most preferred to have resiliency in a number of the pivotal connections between rigid parts in the framework. These resilient pivotal connections include, for example as shown in FIG. 9, the connections between the rock shafts and tool mount bars, and between tool mount bars and adjacent tool mount bars. Resiliency in such pivotal connections or pin joints is readily obtained, for example, by having the pivot pin hole, through one of the two parts being pivotally connected, of somewhat larger diameter than the pin, so that the part with the larger diameter hole is somewhat loose on the pin and is free to rotate on axes at right angles to the axis of the pin. At the same time that the foregoing looseness is provided, it is most preferred to make provision for maintaining the pivotal connection, in its normal, unstressed position, in a cohesive firm but resilient condition. This is readily done by providing resilient washers, 50, for example of the same materials used in the washers described above for the resilient fastenings described above, around the pivot pin on either side of the part with the larger diameter hole, and filling with partially compressed resilient washer, the space along the pin between the parts being resiliently pivotally connected. Again, as for the resilient fastening described above, the resilient washers could be replaced by strong, partially compressed, coiled springs, or by belleville washers or stacks of partially compressed split lock washers. With pivotal connections thus rendered resilient, these pin joints are converted, to an appreciable degree, into ball and socket joints, in that besides being able to move relative to one another around the axis of their pivot pin, rigid parts joined by the resilient pivotal connections are able to move relative to one another around the two axes at mutual right angles to the axis of the pivot pin; the restricted degree of extra movement thus permitted between rigid parts is usually sufficient to eliminate or reduce greatly the stress that would otherwise be put on one rigid part by abnormal movement of another rigid part pivotally connected thereto.

In FIG. 2 there is illustrated, by a diagrammatic representation, a multisection framework for supporting a multiplicity of ground working tools in accordance with a further embodiment of the invention, having a center section and two wing sections on each side thereof. All six wheels of the section are shown, but the "tricycle" wheel frames are not shown. However, the theoretical C axes, passing through the pairs of pivot points C1 and C2 respectively of FIG. 1 are shown, as dotted lines. The rock shafts 5 and 6 are not shown; however they would most conveniently be located between the respective C and A axes, being longitudinally disposed therebetween. The "A" axes are shown as dot-dash lines. The pivotal attachment of rigid parts which are located along the A axes most preferably all are resilient pivotal connections, for example as described earlier herein with reference to FIG. 9. The rigid flanges 3, 4, 7, and 8, pivotally connecting the rock shafts to the wheel frames, are shown to illustrate the relative positions of these parts. Aligned with the tool mount bars 19, 20 and 21 respectively of the center section are the tool mount bars of the wing sections, the preferably resilient pivotal connections between the laterally adjacent bars being along the B axes (the short dash lines) between the various adjacent sections respectively. Being aligned along the B axes, the pivotal connections of the tool mount bars between the various sections permit ample flexing between the relatively rigid planes of the respective individual sections, and further permit folding of the wing sections towards the center section when it is desired to reduce the width of the implement drastically for easy transportation, as is conventional in the agricultural implement art. Besides the pivotal connections between the tool mount bars along the B axes between adjacent sections, the only other connections between the sections are the drawbar means and the means connected to the power means to pivot the wing section rock shafts, simultaneously and through equal angles around their respective pivotal axes. Drawbar means, conventional in the art, make provision for flexing at pivotal connections between laterally adjacent sections of multisection agricultural implements. Similarly, the power means to pivot the rock shafts extends transversely from the points of attachment to the rock shafts at points proximate the B axes of the center section, across the inner wing sections where it attaches pivotally to the rock shafts of these sections at points proximate their respective B axes, and further across the outer wing sections to the rock shafts where it again attaches pivotally at points proximate the respective B axes. These extensions of the power means from the center section to the wing section most conveniently are in the form of simple rigid extension bars 31 (FIG. 4) which transmit the simultaneous and equal displacement of the rigid bar mechanisms 12 and 16 (FIG. 1) of the center section to the rock shafts of the respective adjoining wing sections. By connecting the extension bars to one another and to the rigid bar mechanisms 12 and 16 at points proximate the respective B axes, the whole rigid bar and extension bar arrangement is capable of flexing and folding along the B axes between sections when the framework is passing over uneven, undulating ground or being folded for transportation.

It will noted that the wing section wheel frames not shown in FIG. 2, are represented as having only two wheels each; thus the wheel frames of the wing section are "bicycle" wheel frames, although they could equally well be "tricycle" wheel frames. "Tricycle" wheel frames are preferred for the center section as they provide more wheels to carry the weight of the wing sections when the latter are folded into transport position, as is commonly done with wide agricultural implements. "Bicycle" wheel frames can provide adequate support for wing sections, but "tricycle" wheel frames, of lighter construction than those of the center section, can be used for the lighter loads carried by the wing section wheels, and may be preferred for their greater inherent vertical stability.

There has been mentioned earlier herein an optional embodiment of power means suitable to achieve simultaneous and equal displacement of the rock shafts, whereby the height of the tool mount bars, and all ground working tools mounted thereon, is uniformly varied. This embodiment is now to be described with reference to FIG. 4. This figure is a front elevation of two rigid bar mechanisms which both achieve their equal displacement power from the same single hydraulic ram or hydraulic cylinder. The two rigid bar mechanisms 12 and 16 are both pivotally attached indirectly to a single transverse frame member, preferably the second tool mount bar 20. The rigid bar mechanisms also are pivotally attached at opposite ends of the single hydraulic cylinder 27. The indirect attachment of rigid bar mechanism 12 to tool mount bar 20 is achieved through rigid pivoting lever 28, which is pivotally attached, proximate its center, to one face, for example the front, of tool mount bar 20, and also pivotally attached at its first end to the end of the hydraulic cylinder 27 to which rigid bar mechanism 12 is pivotally attached, on the same pivot. Indirect attachment of rigid bar mechanism 16 to tool mount bar 20 is achieved through rigid pivoting link, 29, which is pivotally attached, near one of its ends, to the same face, i.e. the front, of tool mount bar 20 at an appropriate distance from the pivotal attachment of pivoting lever 28. The distal end of pivoting link 29 is pivotally attached to the end of hydraulic cylinder 27 to which rigid bar mechanism 16 is pivotally attached, on the same pivot. The distal end of pivoting lever 28 is pivotally attached to one end of a rigid evener link, 30, the distal end of which is pivotally fastened to the pivoting link 29, optionally on the same pivot as the attachment of pivoting link 29 to hydraulic cylinder 27 and rigid bar mechanism 16. Alternatively, to avoid crowding of members at pivotal attachments, the distal end of evener link 30 can be pivotally attached to pivoting link 29 at a pivot point at a location between the pivot points near the ends of pivoting link 29, as shown by the dotted line position of evener link 30. The pivotal attachments of this link are arranged to allow equivalent rotation of lever 28 and link 29 and thus equal displacement of the ends of cylinder 27 as it extends or contracts. The end of rigid bar mechanism 12 remote from hydraulic cylinder 27 is pivotally attached to rigid flange lever 9 at pivot point 11 (FIG. 1), the flange lever 9 being rigidly fastened to rock shaft 5, not shown in FIG. 4. Also rigidly attached to rock shaft 5 is rigid flange 7. Near its lower end the flange 7 is pivotally attached at pivot points C1 to wheel frame 1. It can readily be seen from FIG. 4 that extension and contraction of hydraulic cylinder 27 displaces rigid bar mechanism 12 and rotates flange lever 9 and its rigidly fastened rock shaft around axis A which passes through pivoting connection A1 on the rock shaft and the bottom of flange 22 on tool mount bar 20. At the same time the rock shaft and rigidly fastened flange 7 will rotate around pivot point C1 on top of wheel frame 1, varying the relative elevation of tool mount bar 20 with reference to wheel frame 1 which, through wheels 2, rests on the ground. When rigid bar mechanism 12 of this embodiment is displaced, rigid bar mechanism 16 is likewise displaced, and by the operation of the evener link 30, is displaced an equal amount, causing equivalent rotation of rock shaft 6 at pivoting connection A2 and through flange 8 around pivot point C2 and the other wheel frame 1.

At pivot point 15, where rigid bar mechanism 16 pivots on flange lever 10, a rigid extension bar 31 also is pivotally attached and serves to transmit the displacement of rigid bar mechanism 16 to the rigid flange lever 32 on the rock shaft of an adjacent wing section having its wheel frame 33. In this manner the tool mount bar 34 of the wing section has its relative elevation, with reference to its wheel frame, varied simultaneously and in the same amount as that of the center section tool mount bars. The wing section tool mount bar 34 is pivotally attached to flange 22 on tool mount bar 20 at pivoting connection B2.

When it is desired to raise the wing sections into transport position their tool mount bars will pivot on the B axes and the tool mount bars will be in a raised position so that attached ground working tools will be clear of the ground. With the tool mount bars thus raised, the pivot connection 15 between rigid bar mechanism 16 and extension bar 31 will be in close proximity to, if not exactly aligned with, axis B, so that rotation of the wing section about axis B will cause only slight, if any, variation in displacement of rigid extension bar 31 relative to the rest of the wing section, thus moving the wheel frame mechanism slightly, at most, and well within the bounds of its operating range of movement. Thus the extension bar 31 can fold conveniently with the tool mount bars.

In the same manner that the end of the wing section tool mount bar 34, adjacent the center section, pivots at pivoting connection B2 on flange 22 of tool mount bar 20, FIG. 4, an end of tool mount bar 35 (FIG. 5) pivots at a pivotal connection B3 on a flange 22 at the outer end of tool mount bar 34. Tool mount bar 35 forms part of an outer wing section which has its respective rock shaft, wheel frame, and wheels, and is raised or lowered simultaneously with the center and adjacent wing sections by displacement of another rigid extension bar 36 pivotally attached at one end to extension bar 31 at the pivoting connection of the latter to flange lever 32 on the rock shaft of the first or inner wing section. The distal end of extension bar 36 is pivotally connected to flange lever 37 on the rock shaft of the outer wing section having its wheel frame 38. The tool mount bar 35 of the outer wing section has its relative elevation, with reference to its wheel frame 38, varied simultaneously and in the same amount as that of the center section and inner wing section tool mount bars, by the simultaneous displacement of the connected extension bars 31 and 36.

Numerous modifications can be made in the various elements of the invention besides those already indicated in detail above. For example, the wheel frames, which are carried by front and rear wheels of each section, are not necessarily unitary nor rigid, nor do they necessarily extend directly between their respective front and rear wheels. Thus a rigid elongated front part of a wheel frame can have its forward end mounted on a castoring front wheel and its rearward end pivotally and slidably attached, on a horizontal transverse axis, to a tool mount bar, while a separate rigid rear part of said wheel frame is mounted on the respective rear frame wheel or transversely spaced wheels and is pivotally attached, on a generally longitudinal axis, to its respective rigid rock shaft which also is pivotally attached, on a generally longitudinal axis, to the rigid front part of the wheel frame. The rock shaft, pivotally attached to each of the front and rear parts of the wheel frame, thus serves to distribute the load, applied to the rock shaft by the tool mount bars which are mounted thereon, to both the front and rear parts of the wheel frame and hence to the front and rear wheels, even though the front and rear parts of the wheel frame are separate, because these parts are directly pivotally connected by the rock shaft, which is rigid. Furthermore, with an arrangement of separate front and rear wheel frame parts as just described, it is not necessary that a rock shaft be horizontally aligned, nor that it be straight. For convenience a rock shaft can be inclined so that the pivoting axis between said rock shaft and the tool mount bars mounted thereon is inclined to intersect the horizontal axis through the pivot points between tool mount bars of adjacent framework sections. By having such intersection at a pivot point in folding drawbar means used to draw the framework over the ground, the folding of the drawbar means with the folding of the wing sections for transportation purposes is facilitated; other advantages also accrue to the use of an inclined rock shaft. With the pivot axis between the rock shaft and tool mount bars thus inclined, the pivot axes between the rock shaft and the wheel frame or wheel frame parts also must be inclined so as to be parallel to said first mentioned inclined axis, thus permitting freedom of rotation of the rock shaft simultaneously about all the points of pivotal attachment thereof. Rotation of the rock shaft causes lateral displacement of the rock shaft and wheel frame, as well as relative vertical movement between the two. Because the rearward end of the front part of the wheel frame in this embodiment is slidably pivotally attached to a tool mount bar, lateral displacement of this end of said wheel frame part is readily accommodated.

An example of an embodiment of the features just described is illustrated in FIGS. 6 and 7 of the drawings. In these Figures a front wheel 2 is castor mounted in and supports the forward end of the elongated front part 1F of a wheel frame. A pair of rear wheels 2R is mounted to provide support for the rear part 1R of said wheel frame. The rearward end of said front part of the wheel frame is pivotally and slidably attached, at horizontal, transverse, pivot axis 39, to the underside of front tool mount bar 19. Frame bar 18 connects tool mount bars 19, 20, and 21. Rock shaft 5, beyond the wheel frame in the view of FIG. 6, is supported at its forward end on the front part 1F of the wheel frame, to which it is pivotally connected by rock shaft flange 3 at pivot point C1. This pivotal connection preferably is a resilient pivotal connection illustrated in the details of FIG. 9 between rock shaft flange 7 and tool mount bar flanges 22. Rock shaft 5 is supported at its rearward end on the rear part 1R of the wheel frame, to which it is pivotally connected by flange 7 at one or more pivot points on longitudinal pivot axis C3. Rock shaft 5 supports tool mount bars 19 and 20 which are pivotally connected to the rock shaft by respective flanges 22 on the tool mount bars and corresponding flanges on the rock shaft. Through these pivotal connections in flanges 22 passes the A axis about which the rock shaft pivots relative to the tool mount bars. In this embodiment the A axis is inclined to the horizontal and inclined parallel thereto are the pivot axis C3 and the axis at pivot point C1; as previously mentioned, the inclined A axis preferably intersects the horizontal B axis passing through the pivot points in the connections between the tool mount bars of an adjoining section (not shown in FIG. 7).

A large agricultural implement with resilient planar frameworks for supporting a multiplicity of ground working tools, as disclosed herein, is capable of flexing, to assume the contours of the ground over which it is passing, in a vastly superior fashion to any framework which is rigidly planar. Hence the resilient planar framework disclosed herein is the most preferred framework for use with the height adjusting mechanism disclosed herein.

Numerous other modifications can be made in the various expedients described herein without departing from the scope of the invention which is defined in the following claims.

What is claimed is:

1. A height adjusting mechanism for a framework that supports a multiplicity of ground working tools of an agricultural implement whereby the tools can be variably positioned for variable ground penetration, comprising:
   (a) a set of at least four wheels mounted on two horizontally and longitudinally disposed wheel frames, each wheel frame being supported by at least two of said wheels, disposed proximate the respective ends of said frames,
   (b) two rigid, longitudinally disposed, rock shafts, each pivotally attached to, at two points proximate the two ends of, a respective one of said wheel frames, said rock shafts being adapted to pivot relative to their respective wheel frames on longitudinal axes passing through the pivotal attachments on their respective wheel frames, at variable elevations above their respective wheel frames,
   (c) two longitudinally spaced, transversely disposed, rigid, horizontal, tool mount bars, each pivotally attached, adjacent its two ends, to the two said rock shafts, said tool mount bars being disposed above said rock shafts and adapted to support two ranks of ground working tools,
   (d) at least two longitudinally disposed, rigid, frame bars, transversely spaced along said tool mount bars and fastened thereto to maintain the latter in spaced parallel relationship, and
   (e) power means to pivot said rock shafts in opposite directions, simultaneously and through equal angles, around their respective pivotal axes.

2. A framework with height adjusting mechanism as claimed in claim 1 and further including a third longitudinally spaced, transversely disposed, rigid, horizontal, tool mount bar fastened to the said two frame bars and adapted to support a third rank of ground working tools.

3. A framework as claimed in claim 2 in which the said third tool mount bar is fastened to the said frame bars behind the first two said tool mount bars.

4. A multisection framework for supporting a multiplicity of ground working tools of an agricultural implement comprising, as a center section, a framework with height adjusting mechanism as claimed in claim 3 and further comprising, on each side of said center section framework, at least one wing section of framework for supporting a multiplicity of ground working tools, each said wing section comprising:
   (a) a set of at least two longitudinally spaced wheels mounted on a horizontally and longitudinally disposed wing section wheel frame,
   (b) a rigid, horizontally disposed, wing section rock shaft, pivotally attached to said wing section wheel frame at points proximate said wheels and adapted to pivot relative to said wheel frame on a horizontal longitudinal axis passing through said points of pivotal attachment to said wheel frame, at variable elevations above said wheel frame,
   (c) longitudinally spaced, transversely disposed, rigid, horizontal, wing section tool mount bars, each one being aligned with a corresponding tool mount bar of said center section, pivotally attached at its end nearer the center section to the adjacent end of the corresponding tool mount bar of the adjacent section, and adapted to pivot on a horizontal axis through the respective pivotal attachments between the corresponding tool mount bars, the distal ends of the first and second of said tool mount bars of said wing section being pivotally attached to and disposed above said wing section rock shaft, (d) a longitudinally disposed, rigid, wing section frame bar, fastened to each said wing section tool mount bar to maintain the latter in spaced parallel relationship, (e) means, connected to said power means, to pivot said wing section rock shaft through equal angles simultaneously with, and in the same direction as, the pivoting of the adjacent rock shaft of said center section.

5. A framework with height adjusting mechanism as claimed in claim 1 in which the power means to pivot the rock shafts is positioned between said rock shafts and comprises:

(a) an hydraulic cylinder pivotally attached at its first end to one end of a rigid pivoting lever, said lever being pivotally attached proximate the center of its length to one of said tool mount bars, and said cylinder being pivotally attached at its second end to one end of a rigid pivoting link, the distal end of said link also being pivotally attached to said tool mount bar in spaced relation to said lever, (b) a rigid evener link, pivotally attached at one end to the distal end of said pivoting lever, said evener link being pivotally attached at its distal end to the said pivoting link, and (c) two rigid bars pivotally attached respectively at their first ends to the two ends of said hydraulic cylinder and pivotally attached at their distal ends respectively to respective flange levers on said two rock shafts, said two rigid bars and respective flange levers being adapted to pivot said rock shafts in opposite directions, simultaneously and through equal angles, around their respective pivotal axes.

6. A framework as claimed in claim 4 in which the power means to pivot the rock shafts in the center section is positioned between said rock shafts and comprises:

(a) an hydraulic cylinder pivotally attached at its first end to one end of a rigid pivoting lever, said lever being pivotally attached proximate the center of its length to one of said tool mount bars, and said cylinder being pivotally attached at its second end to one end of a rigid pivoting link, the distal end of said link also being pivotally attached to said tool mount bar in spaced relation to said lever, (b) a rigid evener link, pivotally attached at one end to the distal end of said pivoting lever, said evener link being pivotally attached at its distal end to the said pivoting link, and (c) two rigid bars pivotally attached respectively at their first ends to the two ends of said hydraulic cylinder and pivotally attached at their distal ends respectively to respective flange levers on said two rock shafts, said two rigid bars and respective flange levers being adapted to pivot said rock shafts in opposite directions, simultaneously and through equal angles, around their respective pivotal axes, and the means, connected to said power means, for pivoting each wing section rock shaft adjacent a center section comprises a first rigid extension bar, pivotally attached at its first end to the pivotal attachment of the adjacent center section rock shaft and its associated rigid bar connected to said hydraulic cylinder, and pivotally attached at its distal end to a first flange lever on said wing section rock shaft, said first rigid extension bar and said first flange lever being adapted to pivot said wing section rock shaft through equal angles simultaneously with, and in the same direction as, the pivoting of the adjacent rock shaft of the center section.

7. A framework as claimed in claim 6, and further including for each remote wing section displaced from said center section by an intervening wing section, a second rigid extension bar, pivotally attached at its first end to the pivotal attachment of the distal end of the rigid extension bar of said intervening wing section and the rock shaft of said intervening wing section, and pivotally attached at its distal end to a second flange lever on the respective remote wing section rock shaft, said second rigid extension bar and said second flange lever being adapted to pivot the remote wing section rock shaft through equal angle simultaneously with, and the same direction as, the pivoting of the adjacent rock shaft of the center section.

8. A framework with height adjusting mechanism as claimed in claim 1, in which there are three wheels associated with each wheel frame and each of said wheel frames comprises:

(1) a rigid elongated front part having its forward end supported by and mounted on a castoring front wheel and its rearward end pivotally and slidably attached, on a horizontal transverse axis, to a tool mount bar, and (2) a rigid rear part supported by and between a pair of rear wheels.

9. A framework as claimed in claim 8, in which the rear part of said wheel frame is pivotally attached to, and supports its respective rock shaft on, a generally longitudinal pivotal axis, and the front part of said wheel frame also is pivotally attached to and supports said rock shaft on a generally longitudinal pivotal axis.

10. A framework as claimed in claim 9, in which the rock shaft is pivotally attached to and supports said two tool mount bars at flanges on the tool mount bars, the axis of the pivotal attachments passing through said flanges being longitudinal and inclined from the horizontal, and both the pivotal axis between the rear part of said wheel frame and the rock shaft and between the front part of said wheel frame and the rock shaft being inclined parallel to said inclined axis.

11. A framework as claimed in claim 10, in which the said inclined axis intersects a horizontal longitudinal axis passing through pivot points in the pivoting connections between said tool mount bars and tool mount bars of an adjoining section of framework.

12. A framework with height adjusting mechanism as claimed in claim 1 in which the said tool mount bars are each resiliently pivotally attached to the said rock shafts, and in which said rigid frame bars are resiliently fastened to said tool mount bars.

13. A framework with height adjusting mechanism as claimed in claim 12 and further including a third longitudinally spaced, transversely disposed, rigid, horizontal, tool mount bar resiliently fastened to the said two frame bars and adapted to support a third rank of ground working tools.

14. A framework as claimed in claim 13 in which the said third tool mount bar is resiliently fastened to the said frame bars behind the first two said tool mount bars.

15. A multisection framework for supporting a multiplicity of ground working tools of an agricultural implement comprising, as a center section, a framework with height adjusting mechanism as claimed in claim 14 and further comprising, on each side of said center section framework, at least one wing section of framework for supporting a multiplicity of ground working tools, each said wing section comprising:
   (a) a set of at least two longitudinally spaced wheels mounted on a horizontally and longitudinally disposed wing section wheel frame,
   (b) a rigid, horizontally disposed, wing section rock shaft, pivotally attached to said wing section wheel frame at points proximate said wheels and adapted to pivot relative to said wheel frame on a horizontal longitudinal axis passing through said points of pivotal attachment to said wheel frame, at variable elevations above said wheel frame,
   (c) longitudinally spaced, transversely disposed, rigid, horizontal, wing section tool mount bars, each one being aligned with a corresponding tool mount bar of said center section, resiliently pivotally attached at its end nearer the center section to the adjacent end of the corresponding tool mount bar of the adjacent section, and adapted to pivot on a horizontal axis through the respective resilient pivotal attachments between the corresponding tool mount bars, the distal ends of the first and second of said tool mount bars of said wing section being resiliently pivotally attached to and disposed above said wing section rock shaft,
   (d) a longitudinally disposed, rigid, wing section frame bar, resiliently fastened to each said wing section tool mount bar to maintain the latter in spaced parallel relationship, and
   (e) means, connected to said power means, to pivot said wing section rock shaft through equal angles simultaneously with, and in the same direction as, the pivoting of the adjacent rock shaft of said center section.

16. A framework with height adjusting mechanism as claimed in claim 14 in which the power means to pivot the rock shafts is positioned between said rock shafts and comprises:
   (a) an hydraulic cylinder pivotally attached at its first end to one end of a rigid pivoting lever, said lever being pivotally attached proximate the center of its length to one of said tool mount bars, and said cylinder being pivotally attached at its second end to one end of a rigid pivoting link, the distal end of said link also being pivotally attached to said tool mount bar in spaced relation to said lever,
   (b) a rigid evener link, pivotally attached at one end to the distal end of said pivoting lever, said evener link being pivotally attached at its distal end to the said pivoting link, and
   (c) two rigid bars pivotally attached respectively at their first ends to the two ends of said hydraulic cylinder and pivotally attached at their distal ends respectively to receptive flange levers on said two rock shafts, said two rigid bars and respective flange levers being adapted to pivot said rock shafts in opposite directions, simultaneously and through equal angles, around their respective pivotal axes.

17. A framework as claimed in claim 15 in which the power means to pivot the rock shafts in the center section is positioned between said rock shafts and comprises:
   (a) an hydraulic cylinder pivotally attached at its first end to one end of a rigid pivoting lever, said lever being pivotally attached proximate the center of its length to one of said tool mount bars, and said cylinder being pivotally attached at its second end to one end of a rigid pivoting link, the distal end of said link also being pivotally attached to said tool mount bar in spaced relation to said lever,
   (b) a rigid evener link, pivotally attached at one end to the distal end of said pivoting lever, said evener link being pivotally attached at its distal end to the said pivoting link, and
   (c) two rigid bars pivotally attached respectively at their first ends to the two ends of said hydraulic cylinder and pivotally attached at their distal ends respectively to respective flange levers on said two rock shafts, said two rigid bars an respective flange levers being adapted to pivot said rock shafts in opposite directions, simultaneously and through equal angles, around their respective pivotal axes,
   and the means, connected to said power means, for pivoting each wing section rock shaft adjacent a center section comprises a first rigid extension bar, pivotally attached at its first end to the pivotal attachment of the adjacent center section rock shaft and its associated rigid bar connected to said hydraulic cylinder, and pivotally attached at its distal end to a first flange lever on said wing section rock shaft, said first rigid extension bar and said first flange lever being adapted to pivot said wing section rock shaft through equal angles simultaneously with, and in the same direction as, the pivoting of the adjacent rock shaft of the center section.

18. A framework as claimed in claim 17, and further including for each remote wing section displaced from said center section by an intervening wing section, a second rigid extension bar, pivotally attached at its first end to the pivotal attachment of the distal end of the rigid extension bar of said intervening wing section and the rock shaft of said intervening wing section, and pivotally attached at its distal end to a second flange lever on the respective remote wing section rock shaft, said second rigid extension bar and said second flange lever being adapted to pivot the remote wing section rock shaft through equal angles simultaneously with, and the same direction as, the pivoting of the adjacent rock shaft of the center section.

19. A framework with height adjusting mechanism as claimed in claim 14, which there are three wheels associated with each wheel frame and each of said wheel frames comprises:
   (1) a rigid elongated front part having its forward end supported by and mounted on a castoring front wheel and its rearward end pivotally and slidably attached, on a horizontal transverse axis, to a tool mount bar, and
   (2) a rigid rear part supported by and between a pair of rear wheels.

20. A framework as claimed in claim 19, in which the rear part of said wheel frame is pivotally attached to, and supports its respective rock shaft on, a generally longitudinal pivotal axis, and the front part of said wheel frame also is pivotally attached to and supports said rock shaft on a generally longitudinal pivotal axis.

21. A framework as claimed in claim 20, in which the rock shaft is pivotally attached to and supports said two tool mount bars at flanges on the tool mount bars, the axis of the pivotal attachments passing through said flanges being longitudinal and inclined from the horizontal, and both the pivotal axis between the rear part of said wheel frame and the rock shaft and between the front part of said wheel frame and the rock shaft being inclined parallel to said inclined axis.

22. A framework as claimed in claim 21, in which the said inclined axis intersects a horizontal longitudinal axis passing through pivot points in the pivoting connections between said tool mount bars and tool mount bars of an adjoining section of framework.

* * * * *